United States Patent
Dutt et al.

(10) Patent No.: US 11,068,863 B2
(45) Date of Patent: Jul. 20, 2021

(54) SYSTEMS AND METHODS OF PENDING TRANSACTION AUGMENTATION AND AUTOMATIC ATTACHMENT TO SETTLED TRANSACTIONS

(71) Applicant: Capital One Services, LLC, McLean, VA (US)

(72) Inventors: Rajsaday Dutt, McLean, VA (US); Faheem Rahman, McLean, VA (US); Sharifa Monawer, New York, NY (US); Suvayan Roy, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/374,904

(22) Filed: Apr. 4, 2019

(65) Prior Publication Data
US 2020/0320486 A1 Oct. 8, 2020

(51) Int. Cl.
*G06Q 20/04* (2012.01)
*G06K 9/00* (2006.01)
*G06Q 20/36* (2012.01)
*G06Q 10/10* (2012.01)
*G06Q 20/20* (2012.01)
*G06Q 20/40* (2012.01)

(52) U.S. Cl.
CPC ....... *G06Q 20/047* (2020.05); *G06K 9/00442* (2013.01); *G06Q 10/10* (2013.01); *G06Q 20/209* (2013.01); *G06Q 20/36* (2013.01); *G06Q 20/401* (2013.01); *G06K 2209/01* (2013.01)

(58) Field of Classification Search
CPC .. G06Q 20/0453; G06Q 10/10; G06Q 20/209; G06K 9/00442
USPC ............................ 705/24, 39, 40, 44, 26.62
See application file for complete search history.

(56) References Cited

U.S. PATENT DOCUMENTS

| | | | |
|---|---|---|---|
| 10,127,247 | B1 | 11/2018 | Arora et al. |
| 10,181,113 | B2* | 1/2019 | Rivalto ............... G06Q 10/087 |
| 2011/0320291 | A1 | 12/2011 | Coon |
| 2012/0290420 | A1 | 11/2012 | Close |
| 2012/0290449 | A1* | 11/2012 | Mullen ............... G06Q 20/3278 705/27.2 |

(Continued)

OTHER PUBLICATIONS

International Search Report and Written Opinion in related PCT Application No. PCT/US20/23513 dated Jul. 15, 2020.

*Primary Examiner* — Vanel Frenel
(74) *Attorney, Agent, or Firm* — Troutman Pepper Hamilton Sanders LLP; Christopher J. Forstner; Brennan M. Carmody (57) ABSTRACT

A method including: receiving an indication of a transaction authorization of a pending transaction, the transaction authorization being requested using a financial account associated with a user; outputting for transmission, to a user device associated with the user, a request for purchase information corresponding to the pending transaction; receiving, from the user device, receipt image data corresponding to a receipt related the pending transaction; storing data indicative of the receipt in correspondence with the pending transaction; determining, based on analyzing a plurality of posted transactions of the financial account, a first posted transaction corresponding to the pending transaction; and storing the data indicative of the receipt in correspondence with the first posted transaction.

20 Claims, 4 Drawing Sheets

(56) References Cited

U.S. PATENT DOCUMENTS

| | | | |
|---|---|---|---|
| 2013/0060699 A1* | 3/2013 | Romagnoli | G06Q 20/10 705/44 |
| 2013/0085887 A1 | 4/2013 | Zhang | |
| 2013/0097078 A1 | 4/2013 | Wong et al. | |
| 2013/0178159 A1* | 7/2013 | Xie | G06Q 20/352 455/41.1 |
| 2013/0218697 A1 | 8/2013 | Kingston et al. | |
| 2013/0218721 A1* | 8/2013 | Borhan | G06Q 30/02 705/26.41 |
| 2013/0304642 A1* | 11/2013 | Campos | G06Q 20/36 705/41 |
| 2014/0012754 A1 | 1/2014 | Hanson et al. | |
| 2014/0040127 A1* | 2/2014 | Chatterjee | G06Q 20/325 705/41 |
| 2014/0040139 A1* | 2/2014 | Brudnicki | G06Q 20/227 705/44 |
| 2014/0046818 A1 | 2/2014 | Chung et al. | |
| 2015/0348018 A1* | 12/2015 | Campos | G06Q 20/12 705/41 |
| 2016/0048865 A1* | 2/2016 | Poon | G06Q 30/0238 705/14.38 |
| 2016/0189119 A1 | 6/2016 | Bowman et al. | |
| 2016/0239839 A1 | 8/2016 | Dillard et al. | |
| 2018/0089666 A1* | 3/2018 | Killian | G06Q 20/36 |
| 2018/0246623 A1 | 8/2018 | Peled et al. | |
| 2019/0080325 A1 | 3/2019 | Pourfallah et al. | |
| 2019/0108509 A1* | 4/2019 | Hammad | G06Q 20/384 |
| 2019/0220852 A1 | 7/2019 | Black et al. | |

* cited by examiner

SYSTEMS AND METHODS OF PENDING TRANSACTION AUGMENTATION AND AUTOMATIC ATTACHMENT TO SETTLED TRANSACTIONS

FIELD

The disclosed technology generally relates to transaction processing, and, more particularly, systems and methods for appending data to pending transactions and attaching to corresponding posted transaction.

BACKGROUND

Many organizations monitor and track employee expenses. Organization often require documentation to approve or reimburse expenses. Yet, in the related art, employees are unable to electronically append information to transactions when they occur. For example, if an employee pays for a business meal, the company may require a receipt and a list of attending individuals in order to reimburse or properly credit the expense. However, in related art solutions, employees must maintain their receipts and remember dates, attendees, and expense purposes days or weeks after the expense in incurred. This creates a highly error prone process, in terms of lost receipts and fading memories.

For instance, when a credit card is used to conduct a transaction, a temporary pending transaction is placed on the credit card. Pending transactions may generally be considered real-time checks to ensure that a specific financial account is able to process the proposed transaction. This temporary transaction is released after a few days, but is not connected with a posted (e.g., settled) transaction placed on the credit card, and identifying pairs of pending and posted transactions is non-trivial. For example, pending and posted transactions may have different transaction values (e.g., tips), a pending transaction may simply be a check on validity (e.g., and not directly leading to a posted transaction), multiple processing attempts may result in a plurality of pending transactions but a single posed transaction, and an authorization amount or date may change between pending and posted transactions (e.g., for a multi-day rental). Furthermore, posted transactions are not always in a same order as the corresponding pending transactions. Thus, related art solutions either require delaying appending of receipts and information until after a transaction settles (often days or weeks after the transaction date), or only capturing receipts in real-time and utilizing optical character recognition (OCR) to attempt to match receipts to ultimately settled transactions. However, OCR is unreliable in this space (failing more than 15% of the time) due to a variety of factors, such as difficulty in deciphering handwriting, old and/or degrading paper and ink (e.g., receipt paper), and idiosyncratic formatting, and such solutions do not allow appending additional information often required for expense reports (e.g., names, department and/or client IDs, descriptions).

Faulty employee memories and the unreliability of prior art systems can greatly increase overhead costs. For example, if an employee misremembers or mis-inputs a date or misapplies a charge, billing processes may be disrupted, requiring investigations, issuance/reissuance of bills and payments, and disruptions to both employees and administrators. Furthermore, denial of reimbursement requests whether accurately (e.g., because and employee is mistaken about reimbursement policies) or inaccurately (e.g., due to a lack of documentation or failure to meet some other formality) can have detrimental effects on employee morale. Thus, the shortcomings of the related art systems can have compounding effects that are detrimental to organizations.

Therefore, there is a need for improved systems and methods to provide transaction augmentation in real-time at the time of sale. Certain aspects of the present disclosure attempt to address these and other issues.

BRIEF SUMMARY

Disclosed embodiments provide systems and methods for pending transaction augmentation and/or automatic attachment to settled transactions.

According to some embodiments, there is provided a method including: receiving an indication of a transaction authorization of a pending transaction, the transaction authorization being requested using a financial account associated with a user; outputting for transmission, to a user device associated with the user, a request for purchase information corresponding to the pending transaction; receiving, from the user device, receipt image data corresponding to a receipt related the pending transaction; storing data indicative of the receipt in correspondence with the pending transaction; determining, based on analyzing a plurality of posted transactions of the financial account, a first posted transaction corresponding to the pending transaction; and storing the data indicative of the receipt in correspondence with the first posted transaction.

The method may further include: receiving, with the receipt image data, transaction classification information; storing the transaction classification information in correspondence with the pending transaction; and storing the transaction classification information in correspondence with the first posted transaction.

The method may further include: analyzing the receipt image data using optical character recognition; and extracting receipt information from the analyzed receipt image data as the data indicative of the receipt image.

The pending transaction may have a first transaction value, and the first posted transaction has a second, different transaction value.

Determining the first posted transaction may include: analyzing the receipt image data to identify one or more post-authorization line-items, adjusting the first transaction value in accordance with the identified one or more post-authorization line items, and determining the first posted transaction based at least in part on the adjusted first transaction value.

The request for purchase information corresponding to the pending transaction may be configured to trigger a persistent request for the receipt image data.

According to some embodiments, there is provided a user device including: at least one processor; and at least one memory having stored thereon computer program code that, when executed by the at least one processor, controls the user device to: activate, on the user device, a virtual wallet application, the virtual wallet application including one or more virtual transaction cards; responsive to a first virtual transaction card of the one or more virtual transaction cards being utilized in an approved transaction, output for display, on the user device, a prompt to provide purchase information; receive receipt data corresponding to a receipt related the approved transaction; and output for transmission, to a transaction server, the receipt data in association with the approved transaction.

The user device may further include a camera. Receiving the receipt data corresponding to the receipt may include: activating, on the user device, a camera application corresponding to the camera; and capturing, using the camera and the camera application, an image of the receipt.

The computer program code, when executed by the at least one processor, may further control the user device to verify the image corresponds to the receipt.

Verifying the image may correspond to the receipt includes: analyzing the image using one or more optical-character recognition algorithms; and comparing the analyzed image with transaction information of the approved transaction.

Receiving the receipt data may correspond to the receipt includes: activating, on the user device, an email application; identifying, within the email application, a receipt email from among a plurality of emails; and extracting receipt information from the identified receipt email.

Identifying the receipt email may include identifying the receipt email based on at least one from among respective delivery dates of the plurality of emails, respective sender addresses of the plurality of emails, and text-analysis of one or more of the plurality of emails.

Extracting the receipt information may include capturing a screenshot of the identified receipt email.

Extracting the receipt information may include forwarding the identified receipt email to an address associated with the transaction server.

Forwarding the identified receipt email may include: receiving an indication of a user input of additional transaction information, the additional transaction information including one or more of notes, a list of attendees, and project codes; and forwarding the additional transaction information together with the identified receipt email to the address associated with the transaction server.

The computer program code, when executed by the at least one processor, may further control the user device to: execute, on the user device, a receipt capturing application; receive the receipt data within the receipt capturing application; and provide, within the receipt capturing application, at least one from among: a notes field for receiving context to an authorized transaction, an attendees field for receiving a listing one or more attendees associated with the authorized transaction, and a project field for receiving relevant project codes associated with the authorized transaction.

The computer program code, when executed by the at least one processor, may further control the user device to automatically populate the attendees field based on a list of attendees of an event associated with the authorized transaction.

The user device may further include a camera. The computer program code, when executed by the at least one processor, may further control the user device to: activate, on the user device, a camera application corresponding to the camera; capture, using the camera and the camera application, one or more images of one or more purchased items associated with the authorized transaction; identify, based on the one or more images, one or more item identities corresponding one or more purchased items; and output for transmission, to the transaction server, data indicative of a list of the one or more items in association with the approved transaction.

The camera application may include a barcode reader, and identifying the one or more items includes identifying, within the one or more images, one or more barcodes corresponding to the one or more items; transforming the one or more barcodes into one or more numerical representations; and matching the one or more numerical representations to identities of the one or more items.

According to some embodiments, there is provided a system including: at least one processor; and at least one memory having stored thereon computer program code that, when executed by the at least one processor, controls the system to: receive, from a user device, an indication of a pending transaction conducted using a virtual transaction card associated with a financial account maintained by a financial institution, the virtual transaction card being instantiated on the user device; outputting for transmission, to the user device, a request for purchase information corresponding to the pending transaction; receiving, from the user device, receipt image data corresponding to a receipt related the pending transaction; storing data indicative of the receipt in correspondence with the pending transaction; determining, based on analyzing a plurality of posted transactions of the financial account, a first posted transaction corresponding to the pending transaction; and storing the data indicative of the receipt in correspondence with the first posted transaction.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to some embodiments, there is provided systems and methods for including attachments to pending transactions and resolving the pending transactions to executed transactions. For example, in some cases, a system identifies an incoming pending transaction and sends a user device a request for information corresponding to the transaction. The user device may belong to a person associated with an account used for the transaction. The user device sends a receipt image, which the system stores with the pending transaction. Later, the system analyzes posted transactions to identify one that corresponds to the pending transaction, and then stores the receipt in association with the identified posted transaction. The receipt image may include one or more of a transaction classification and a post-authorization line-item. The pending and posted transactions may have different values. In some cases, the system determines the first posted transaction, at least in part, by analyzing the receipt image to identify a post-authorization line-item (e.g., tax or tip) and adjusting the pending transaction value by the line-items. In some cases, request for purchase information may trigger a persistent request for the receipt image data from the user (e.g., on one or more user devices).

In some embodiments a user device uses a virtual transaction card to perform a transaction. When the transaction is approved (i.e., as a pending transaction), the user device prompts the user to provide receipt data. Once the receipt data is received, the user device posts it to a transaction server. User may input the receipt data by capturing a picture of the receipt with a camera of the user device. The user device may verify that the image includes the receipt data (e.g., comparing information in the image to the pending transaction) before accepting the image as transaction information (or purchase information). In some cases, the receipt data may be extracted from a receipt email accessed via the user device (e.g., by taking a screenshot of a rendered email or automatically forwarding the email, such as to a one-time, transaction specific email account). The receipt email may be automatically identified from within an email application, e.g., based on at least one from among respective delivery dates of the plurality of emails, respective sender addresses of the plurality of emails, and text-analysis of one or more of the plurality of emails. In some cases, a user may input additional transaction information (e.g., notes, attendees' lists, project codes) into the user device and the receipt data and additional transaction information may be delivered to the transaction server together. The information may be input into an application executing on the user device. The attendees may be auto populated based on a list of attendees of an event associated with the pending transaction (e.g., RSVP's to a lunch meeting). In some cases, the user device may identify and/or extract individual items from the receipt data and associate the same with the pending transaction. In some cases, the user device may receive barcodes (e.g., through image capture or a barcode scanner), identify the scanned items, and associate them with the pending transaction.

In some cases, a system may receive, from a user device, an indication of a pending transaction using a virtual transaction card on the user device, and output, to the user device, a request for purchase information. The system may receive receipt image data and store the receipt in association with the pending transaction. The system may analyze posted transactions to identify one that corresponds to the pending transaction, and then store the receipt data in correspondence with the identified posted transaction.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
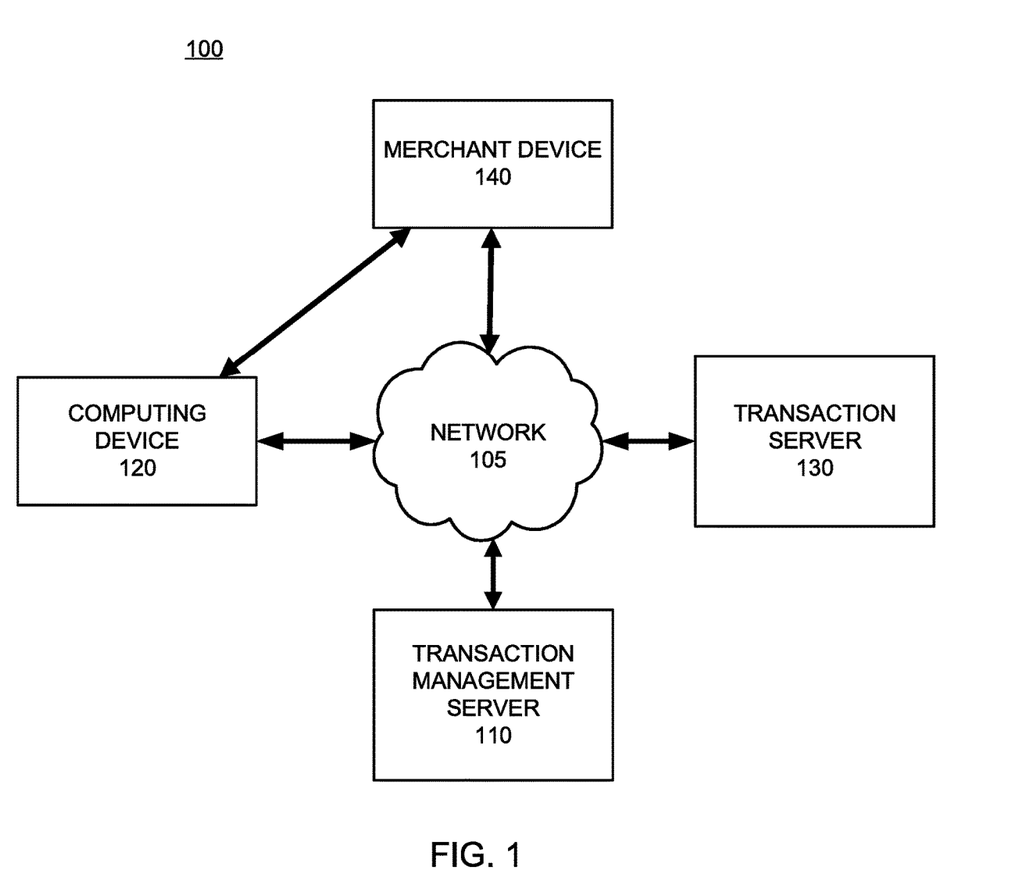
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system environment 100 may include a transaction management server 110 in communication with a user device 120, a transaction server 130, and a merchant device 140 via network 105. In some embodiments, transaction management server 110 may also be in communication with various databases (e.g., email databases). User device 120 may be a mobile computing device (e.g., a smart phone, tablet computer, smart wearable device, portable laptop computer, voice command device, wearable augmented reality device, or other mobile computing device). An example architecture that may be used to implement one or more of the transaction management server 110, user device 120, transaction server 130, and merchant device 140 is described below with reference to FIG. 2.

The transaction management server 110 may provide expense management services. For example, an institutional client card may desire to track spending for employee credit card for tax and/or billing purposes. Transaction management server 110 may provide for appending purchase documentation and/or notes to pending transactions and transferring the same to posted transactions. For example, one or more notes may be manually entered by an employee to provide an explanation of transaction details or other relevant information that may not be apparent from the submitted documentation. In some cases, transaction management server 110 communicates with transaction server 130, which may be associated with a financial institution and records financial transactions. Transaction management server 110 may receive transaction information for transactions (e.g., pending and posted) associated with a specific financial account from the transaction server 130. In some cases, transaction management server 110 may receive an indication of a pending transaction at a financial account (e.g., from transaction server 130 or user device 120) and request, from the user device 120, purchase information corresponding to the pending transaction. Once received, transaction management server 110 may associate the purchase information with the pending transaction. Later, transaction management server 110 receives (e.g., from transaction server 130) indications of one or more posted transactions on the financial account. Transaction management server 110 resolves the pending transaction to one or more of the posted transaction and stores the purchase information in association with at least one of the one or more posted transactions. For example, transaction management server 110 may identify the plurality of transactions and request a manually intervention, may have a default association (e.g., attach to the most expensive transaction or a most-closely matching transaction), or determine that the plurality of posted transactions correspond to the single pending transaction by comparing respective transaction data (e.g., location, merchant, date, and costs). In some other cases, multiple pending transactions may resolve into a single posted transaction, and a plurality of transaction information associated with the multiple pending transactions may be merged (e.g., by transaction management server 110) and attached to the one posted transaction.

User device 120 may be associated with an individual who is authorized to use a financial account (e.g., an account holder or authorized user). When a transaction is conducted (i.e., a pending transaction in added to the financial account), transaction management server 110 may prompt the user to provide transaction details via the user device 120. For example, transaction management server 110 may trigger an expense management program to launch on the user device 120. The user may, through the user device 120, provide transaction information to the transaction management server 110. As non-limiting examples, the transaction information may include a receipt image (e.g., captured with a camera of the user device 120), attendees list, customer or project numbers, accounting (e.g., general ledger or GR) codes, department number, facility ID, department ID, location information, free-entry (e.g., character string), and/or customized fields.

In some cases, the user device 120 may implement a virtual wallet that includes a virtual transaction card linked to the financial account (e.g., at merchant device 140). When the virtual transaction card is used to make a purchase (e.g., through NFC payment communication with merchant device 140), the user device 120 may automatically output prompts to provide the transaction information (e.g., through an expense management application). In some cases, the transaction information may be provided through an email application (e.g., by capturing an image of a receipt email and/or forwarding the receipt email). In some instances, the expense management application may automatically identify and capture a receipt email in the user's email account that corresponds to the pending transaction, for example, through an email plugin or as a forwarded email. In some cases, the receipt may be captured through a text message (either from the merchant or forwarded from the purchaser). In certain cases, an attendees list may be generated and attached from an event RSVP (e.g., from an event on a calendar stored on user device 120). In some cases, the attendees in the attendee list may be selectable such that the user of user device 120 may alter the list based on actual attendance. In certain implementations, the attendee list may be selected based on a location of the user device 120 (e.g., if the event location is at a hotel, the attendee list will only be attached if the user device 120 is determined to be at the hotel).

In some cases, the attendee list may be generated based on proximity sensors. For example, user device 120 may connect or identify nearby devices and/or attendees associated with the nearby devices. The user may then augment or alter the attendee list as necessary, such as by selecting/deselecting names and/or entering additional names. As another example, an attendees list may be generated from an event RSVP, and the proximity sensors may cross-check the RSVP list with nearby devices and/or attendees associated with the nearby devices. In some cases, user device 120 location data (e.g., from a GPS) may be used to automatically select a client/job code (e.g., if the location data is inside a client's office), or provide an expected expense type (e.g., business meal in a restaurant). In certain implementations, the user device 120 location data (e.g., from a GPS) may be attached to a reimbursement request, for example, as confirmation of attendance to an event. In certain embodiments, user device 120 may attach the transaction information to a transaction request (e.g., the additional information is captured and provided to the merchant; the merchant sends the purchase information with the transaction authorization request).

Transaction server 130 may be associated with a financial institution. For example, transaction server 130 may process financial transactions, or manage individual accounts. One of ordinary skill will recognize that transaction server 130 may include one or more logically or physically distinct systems. In some cases, certain aspects of the transaction management server 110 may be implemented through or with transaction server 130 (e.g., if the financial institution provides transaction management services).

Merchant device 140 may be, as a non-limiting example, a point-of-sale device. Merchant device 140 may submit transaction authorization to transaction server 130, which, when authorized, become pending transactions. Merchant device 140 may also request payment from transaction server 130 (e.g., through the automated clearing house (ACH)), which then become posted transactions.

Network 105 may be of any suitable type, including individual connections via the internet such as cellular or Wi-Fi networks. In some embodiments, network 105 may connect terminals using direct connections such as radio-frequency identification (RFID), near-field communication (NFC), Bluetooth™, low-energy Bluetooth™ (BLE), Wi-Fi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
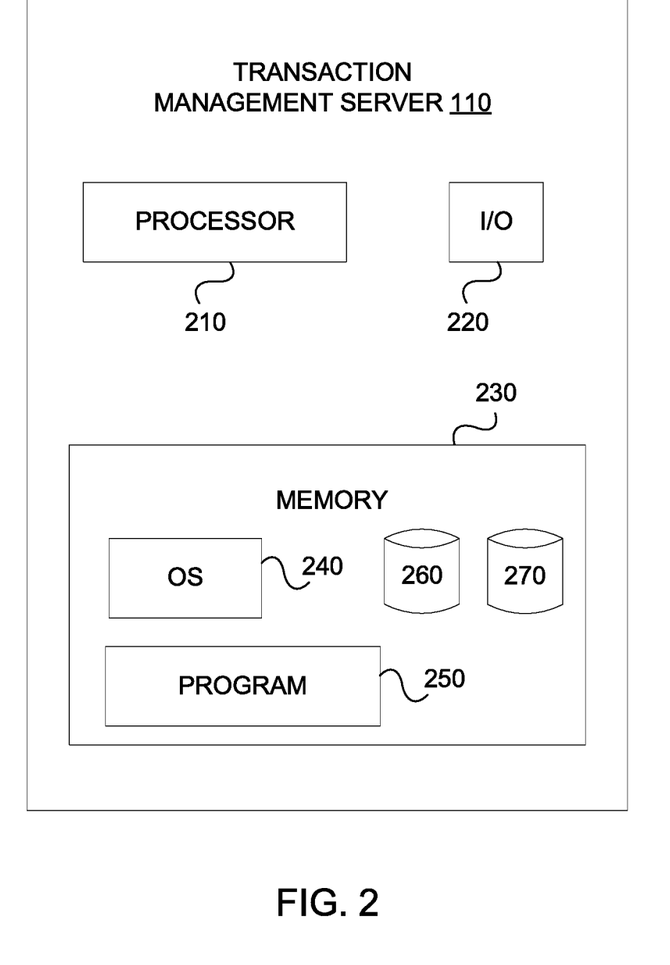
FIG. 2 is a component diagram of a transaction management server according to an example embodiment.

An example embodiment of transaction management server 110 is shown in more detail in FIG. 2. User device 120, transaction server 130, and/or merchant device 140 may have a similar structure and components that are similar to those described with respect to transaction management server 110. As shown, transaction management server 110 may include a processor 210, an input/output ("I/O") device 220, a memory 230 containing an operating system ("OS") 240 and a program 250. For example, transaction management server 110 may be a single server or may be configured as a distributed computer system including multiple servers or computers that interoperate to perform one or more of the processes and functionalities associated with the disclosed embodiments. In some embodiments, transaction management server 110 may further include a peripheral interface, a transceiver, a mobile network interface in communication with processor 210, a bus configured to facilitate communication between the various components of the transaction management server 110, and a power source configured to power one or more components of transaction management server 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, transaction management server 110 may configured to remotely communicate with one or more other devices, such as user device 120. According to some embodiments, transaction management server 110 may utilize a dual-stage neural network pipeline to detect and recognize textual information.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Transaction management server 110 may include one or more storage devices configured to store information used by processor 210 (or other components) to perform certain functions related to the disclosed embodiments. In one example, transaction management server 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, transaction management server 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, transaction management server 110 may include memory 230 that may include one or more programs 250 to perform one or more functions of the disclosed embodiments. Moreover, processor 210 may execute one or more programs 250 located remotely from transaction management server 110. For example, transaction management server 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable transaction management server 110 to perform one or more of the processes and functionalities associated with the disclosed embodiments.

Transaction management server 110 may also be communicatively connected to one or more memory devices (e.g., databases (not shown)) locally or through a network. The remote memory devices may be configured to store information and may be accessed and/or managed by transaction management server 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Transaction management server 110 may also include one or more I/O devices 220 that may include one or more interfaces for receiving signals or input from devices and providing signals or output to one or more devices that allow data to be received and/or transmitted by transaction management server 110. For example, transaction management server 110 may include interface components, which may provide interfaces to one or more input devices, such as one or more keyboards, mouse devices, touch screens, track pads, trackballs, scroll wheels, digital cameras, microphones, sensors, and the like, that enable transaction management server 110 to receive data from one or more users (such as via user device 120).

In example embodiments of the disclosed technology, transaction management server 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While transaction management server 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the transaction management server 110 may include a greater or lesser number of components than those illustrated.

Figure 3:
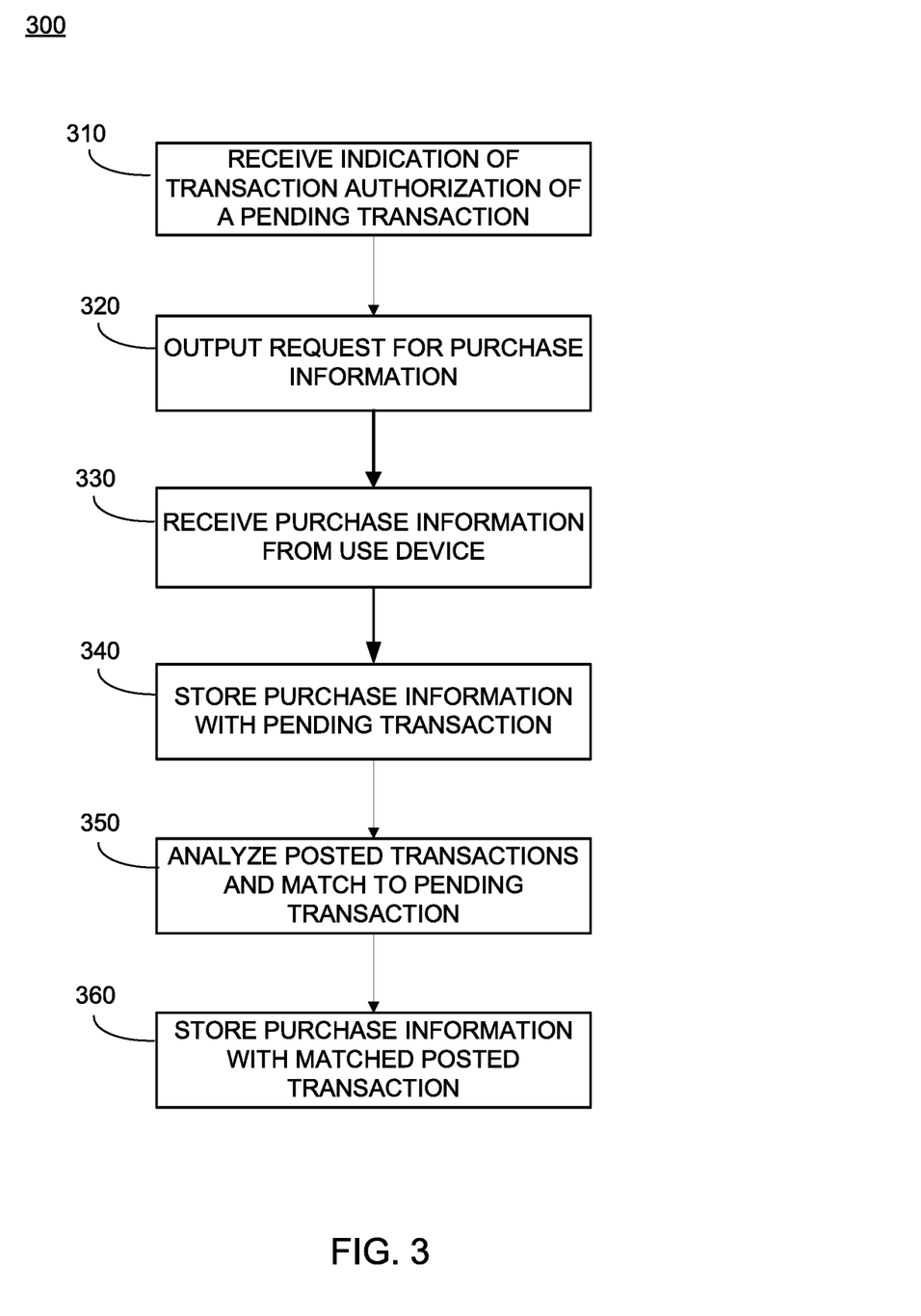
FIGS. 3 and 4 are flowcharts of one or more methods according to certain example embodiments.

FIG. 3 shows a flowchart of a method 300 according to an example embodiment. Method 300 may be performed by, for example, transaction management server 110.

Transaction management server 110 receives 310 an indication of a transaction authorization of a pending transaction. The transaction may be requested using a financial account associated with a user (e.g., of user device 120). In some cases, the indication of a pending transaction may be received from a financial institution system (e.g., transaction server 130). In other instances, the indication of the pending transaction may be received from a user device (e.g., user device 120). For instance, use of a virtual card instantiated on user device 120 may trigger user device 120 to notify transaction management server 110 of the pending transaction. In some cases, transaction management server 110 may poll transaction server 130 for the pending transaction information after being notified by user device 120.

Transaction management server 110 outputs 320 (e.g., outputs for transmission), a request for purchase information corresponding to the pending transaction. For example, transaction management server 110 may request that user device 120 provide additional information regarding the pending transaction. In some cases, transaction management server 110 may trigger user device 120 to launch an expense management application for capturing/receiving transaction information. In some cases, requesting the purchase information from user device 120 may create a persistent request. For example, a user may be prevented from accessing one or more features of the user device 120 until the purchase information is provided. In some cases, the request for transaction information may be repeatedly transmitted to one or more user devices 120 (e.g., computer, phone, laptop) until the purchase information is provided.

Next, transaction management server 110 receives 330 the purchase information (e.g., from user device 120). Transaction management server 110 stores 340 the purchase information with the pending transaction. For example, transaction management server 110 may keep a copy of records of pending and posted transactions and link the purchase information to the pending transaction. As non-limiting examples, the purchase information may include receipt image data, attendees list, client and/or project codes, location information, transaction classification information, and/or event information. In a case where the purchase information includes receipt image data, transaction management server 110 may analyze the receipt image data (e.g., using optical character recognition) to extract receipt information (e.g., merchants, time codes, items, costs), and store the extracted receipt information with the pending transaction. Transaction management server 110 may confirm that the receipt image corresponds to the pending transaction, such as by analyzing the image using OCR algorithm(s) and comparing the captured text data (e.g., dates, merchants, locations, cost) to the pending transaction (e.g., transaction date, location, amount).

Transaction management server 110 analyzes 350 one or more posted transactions and matches a first posted transaction to the pending transaction. The transaction management server 110 may receive the posted transactions from transaction server 130 (e.g., through daily or hourly polling). In some cases, the pending transaction and corresponding posted transaction have different transaction values. Thus, to match the transactions, transaction management server 110 may identify, within receipt image data, one or more post-authorization line items (e.g., tip on a restaurant bill) and adjust the transaction value of the pending transaction by the post-authorization amount to help identify a corresponding posted transaction. The identification of post-authorization line items may be performed using machine-learning algorithms, though this is only an example.

In some cases, the notes entered for the pending transaction may be used to direct the reconciliation of posted transactions with pending transactions. For example, the notes may include indications of a vendor, and transaction management server 110 may use natural language processing to determine the vendor for the pending transaction from the notes and to better associate the pending transaction with a posted transaction. In some cases, the notes may not relate to transaction reconciliation, but rather be attached for accounting or reporting purposes (e.g., to be reviewed by the accounting department should further review be required).

As will be understood by one of ordinary skill in light of the present disclosure, typically pending transactions and posted transactions have great overlap. However, exceptions to this general rule (e.g., different transaction amounts, pending transactions without posted transactions, multiple pending transactions resolved to a single posted transaction, a single pending transaction resolving to a plurality of posted transactions, and/or changes to transaction dates, amounts, or locations) are very difficult to identify using related-art techniques. Accordingly, in some cases, machine-learning is used to analyze the posted and pending transactions and purchase information to identify matches. For example, by training machine learning algorithms, they algorithms may decide whether to match or not match. Example determination characteristics include vendor name, date and times, transaction amount, and transaction location. The machine learning may be updated during execution, for example, by prompting users and/or spot-checking assignments. In some cases, past decisions may be stored in a database and used for training the machine learning algorithms.

Transaction management server 110 then stores the purchases information with the matched posted transaction. In some cases, storing the purchase information may include providing the purchase information to transaction server 130 as a tag with the processed transaction. In some implementations, transaction management server 110 may create an expense report, for example, by embedding the purchase information and posted transaction details into a report and sending the same to an organization's accounting department.

Figure 4:
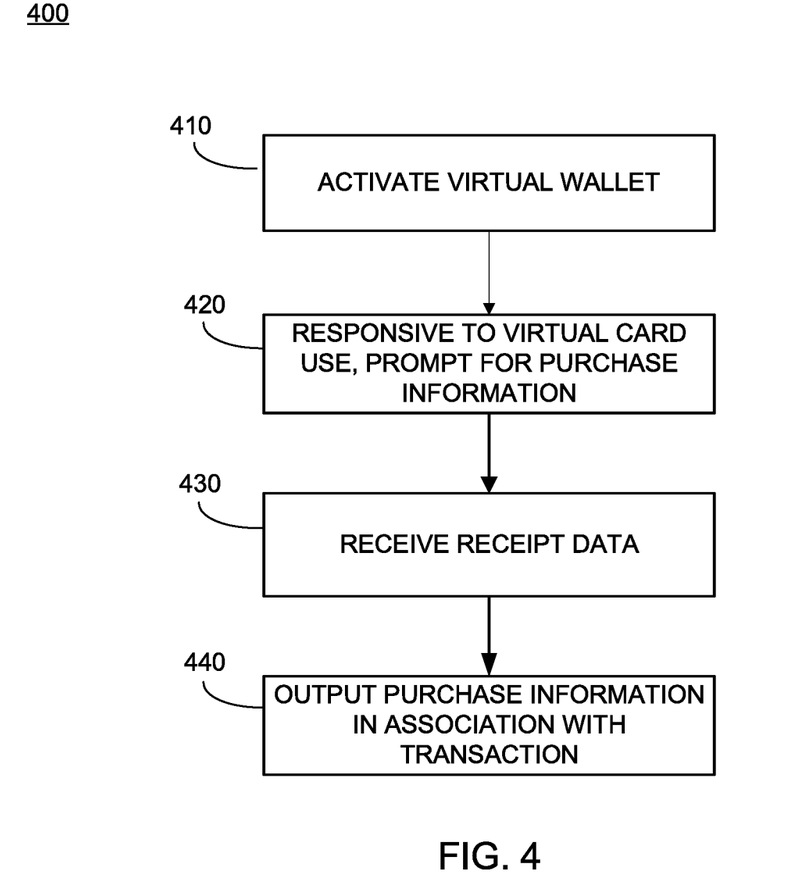

FIG. 4 shows a flowchart of a method 400 according to an example embodiment. Method 400 may be performed by, for example, user device 120.

User device 120 activates 410 (e.g., in response to user commands) a virtual wallet application. The virtual wallet includes one or more virtual transaction cards. The virtual transaction cards may be associated with a financial account handled by transaction server 130. Once a virtual transaction card is used to make a purchase, user device 120 may prompt 420 the user for purchase information. For example, user device 120 may output a popup on a display of the user device 120 requesting the purchase information. In some cases, user device 120 may execute and/or activate an expense management application, e.g., implementing one or more graphical-user interfaces (GUIs). For example, the expense management application may include fields for notes, receipts, expense report kind, expense category or type, designation of expense (personal or business), attendees, etc. These may be editable as text fields, drop-down menus, check boxes, and the like. The user may enter the information through the user device 120 (e.g., into the expense management application).

User device 120 receives 430 receipt data. The receipt data may include, receipt data and/or configurable data (e.g., notes, attendees, items, project/department/client codes). In some cases, the user device 120 may capture an image of a printed receipt. User device 120 may be configured to analyze (e.g., with OCR, edge detection, and/or image analysis) the image to confirm that received image includes a receipt. Confirming the image includes a receipt may include analyzing the image using OCR algorithm(s) and comparing the captured text data (e.g., dates, merchants, locations, cost, notes) to transaction information captured from the virtual transaction card to confirm that the receipt in the image corresponds to the transaction.

In some cases, user device 120 may receive the receipt data through an email application. For example, user device 120 may activate an email application, identify within the email application a receipt email, and extract the receipt information. In some cases, a user may identify the receipt information. In other implementation, the user device 120 may identify the receipt email based on at least one sending/receiving timestamps on the emails, sender addresses, and text and/or image-analysis of the plurality of emails. For example, user device 120 a receipt email as one sent subsequent (but near-in time) to the use of the virtual transaction card, may be from a domain associated with the merchant, and/or include certain receipt identifiers, such as "total," "tax," and "order number." In certain instances, merchants and/or vendors may forward email receipt associated with registered users to a central receipt processing center (e.g., forward the receipt email to a designated email address), along with purchaser identification. In some cases, user device 120 may extract the receipt information by capturing a screenshot (or image rendering) of the receipt email. In some cases, user device 120 may forward the receipt email to an address associated with transaction management server 110. The forwarded email may include additional information (e.g., notes, a list of attendees, and project codes).

In some cases, the configurable data may be received through user interfaces (UI) (e.g., graphical user interfaces (GUI)) of an expense management application. The expense management application may include one or more fields including a notes field for receiving context to the authorized transaction, an attendees field for receiving a listing one or more attendees associated with the authorized transaction, and a project field for receiving relevant project codes associated with the authorized transaction.

In certain implementations, certain portions of the configurable data may be automatically generated and/or predicted. For example, if the virtual transaction card is used during a calendar event (e.g., a business lunch) and/or at an expected location, user device 120 may identify individuals who accepted a calendar invite to populate an attendee list. In other instances, user device 120 may identify proximate external devices (e.g., user devices of other individuals) through, for example, connections (e.g., Bluetooth), proximity sensors, and/or traffic sniffing, and populate an attendee list based on proximate attendees. In other cases, user device 120 may use geolocation data (e.g., GPS data, IP addresses or networks, and/or merchant identifiers) to determine which client and/or job corresponds to a given purchase. For example, if the user device 120 is located near a client's office, user device 120 may determine that client is the most appropriate bill code. As another example, using continuous learning around a user's behavior (e.g., previous tagging of previous vendors).

According to some embodiments, user device 120 may identify one or more purchased items. For example, user device 120 may analyze the receipt data to identify line items. In other cases, user device 120 may capture one or more images of purchased items, and identify (e.g., through image matching) and list the purchased items. In some instances, user device 120 may capture images of item barcodes and identify the items using (for example) a barcode reader. For example, user device 120 may translate the barcodes to numerical representations (e.g., product codes) and match the product codes to specific purchased items.

User device 120 outputs 440 the purchase information in association with the transaction. For example, in some cases, user device 120 may transmit the purchase information to merchant device 140, and the merchant device may send the transaction server 130 the purchase information (e.g., with the transaction authorization request or with the payment request (posted transaction)). As another example, user device 120 may send the purchase information to the transaction management server 110 associated with the pending transaction (e.g., with a transaction ID). Transaction management server 110 may then associate output for transmission, to a transaction server, the receipt data in association with the approved transaction.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

An embodiment of the present disclosure may be implemented according to at least the following:

Clause 1: A method including: receiving an indication of a transaction authorization of a pending transaction, the transaction authorization being requested using a financial account associated with a user; outputting for transmission, to a user device associated with the user, a request for purchase information corresponding to the pending transaction; receiving, from the user device, receipt image data corresponding to a receipt related the pending transaction; storing data indicative of the receipt in correspondence with the pending transaction; determining, based on analyzing a plurality of posted transactions of the financial account, a first posted transaction corresponding to the pending transaction; and storing the data indicative of the receipt in correspondence with the first posted transaction.

Clause 2: The method of clause 1 further including: receiving, with the receipt image data, transaction classification information; storing the transaction classification information in correspondence with the pending transaction; and storing the transaction classification information in correspondence with the first posted transaction.

Clause 3: The method of clauses 1 or 2 further including: analyzing the receipt image data using optical character recognition; and extracting receipt information from the analyzed receipt image data as the data indicative of the receipt image.

Clause 4: The method of any of clauses 1-3, wherein the pending transaction has a first transaction value, and the first posted transaction has a second, different transaction value.

Clause 5: The method of clause 4, wherein determining the first posted transaction includes: analyzing the receipt image data to identify one or more post-authorization line-items, adjusting the first transaction value in accordance with the identified one or more post-authorization line items, and determining the first posted transaction based at least in part on the adjusted first transaction value.

Clause 6: The method of any of clauses 1-5, wherein the request for purchase information corresponding to the pending transaction is configured to trigger a persistent request for the receipt image data.

Clause 7: A user device including: at least one processor; and at least one memory having stored thereon computer program code that, when executed by the at least one processor, controls the user device to: activate, on the user device, a virtual wallet application, the virtual wallet application including one or more virtual transaction cards; responsive to a first virtual transaction card of the one or more virtual transaction cards being utilized in an approved transaction, output for display, on the user device, a prompt to provide purchase information; receive receipt data corresponding to a receipt related the approved transaction; and output for transmission, to a transaction server, the receipt data in association with the approved transaction.

Clause 8: The user device of clause 7 further including a camera, wherein receiving the receipt data corresponding to the receipt includes: activating, on the user device, a camera application corresponding to the camera; and capturing, using the camera and the camera application, an image of the receipt.

Clause 9: The user device of clause 8, wherein the computer program code, when executed by the at least one processor, further controls the user device to verify the image corresponds to the receipt.

Clause 10: The user device of clause 9, wherein verifying the image corresponds to the receipt includes: analyzing the image using one or more optical-character recognition algorithms; and comparing the analyzed image with transaction information of the approved transaction.

Clause 11: The user device of any clauses 7-10, wherein receiving the receipt data corresponding to the receipt includes: activating, on the user device, an email application; identifying, within the email application, a receipt email from among a plurality of emails; and extracting receipt information from the identified receipt email.

Clause 12: The user device of clause 11, wherein identifying the receipt email includes identifying the receipt email based on at least one from among respective delivery dates of the plurality of emails, respective sender addresses of the plurality of emails, and text-analysis of one or more of the plurality of emails.

Clause 13: The user device of clauses 11 or 12, wherein extracting the receipt information includes capturing a screenshot of the identified receipt email.

Clause 14: The user device of clauses 11-13, wherein extracting the receipt information includes forwarding the identified receipt email to an address associated with the transaction server.

Clause 15: The user device of clause 14, wherein forwarding the identified receipt email includes: receiving an indication of a user input of additional transaction information, the additional transaction information including one or more of notes, a list of attendees, and project codes; and forwarding the additional transaction information together with the identified receipt email to the address associated with the transaction server.

Clause 16: The user device of clauses 7-15, wherein the computer program code, when executed by the at least one processor, further controls the user device to: execute, on the user device, a receipt capturing application; receive the receipt data within the receipt capturing application; and provide, within the receipt capturing application, at least one from among: a notes field for receiving context to an authorized transaction, an attendees field for receiving a listing one or more attendees associated with the authorized transaction, and a project field for receiving relevant project codes associated with the authorized transaction.

Clause 17: The user device of clause 16, wherein the computer program code, when executed by the at least one processor, further controls the user device to automatically populate the attendees field based on a list of attendees of an event associated with the authorized transaction.

Clause 18: The user device of clauses 16 or 17 further including a camera, wherein the computer program code, when executed by the at least one processor, further controls the user device to: activate, on the user device, a camera application corresponding to the camera; capture, using the camera and the camera application, one or more images of one or more purchased items associated with the authorized transaction; identify, based on the one or more images, one or more item identities corresponding one or more purchased items; and output for transmission, to the transaction server, data indicative of a list of the one or more items in association with the approved transaction.

Clause 19: The user device of clause 18, wherein the camera application includes a barcode reader, and identifying the one or more items includes identifying, within the one or more images, one or more barcodes corresponding to the one or more items; transforming the one or more barcodes into one or more numerical representations; and matching the one or more numerical representations to identities of the one or more items.

Clause 20: A system including: at least one processor; and at least one memory having stored thereon computer program code that, when executed by the at least one processor, controls the system to: receive, from a user device, an indication of a pending transaction conducted using a virtual transaction card associated with a financial account maintained by a financial institution, the virtual transaction card being instantiated on the user device; outputting for transmission, to the user device, a request for purchase information corresponding to the pending transaction; receiving, from the user device, receipt image data corresponding to a receipt related the pending transaction; storing data indicative of the receipt in correspondence with the pending transaction; determining, based on analyzing a plurality of posted transactions of the financial account, a first posted transaction corresponding to the pending transaction; and storing the data indicative of the receipt in correspondence with the first posted transaction.

Clause 21: A non-transitory computer readable medium having stored thereon instructions for executing a method according to any of clauses 1-6.

EXAMPLE USE CASES

The following example use cases describe examples of a use of systems and methods for appending data to pending transactions and attaching to corresponding posted transaction. These examples use cases are intended solely for explanatory purposes and not for limitation. In one case, a user wishes to easily annotate transactions. Accordingly, the user registers his credit card(s) and user device(s) with a transaction manager (e.g., transaction management server 110). The transaction manager may link to the credit card account(s) at a financial institution (e.g., transaction server 130). When a transaction authorization request is approved for the credit card account, the account has a pending transaction. The financial institution alerts the transaction manager of the pending transaction. The transaction manager then prompts the user device(s) for purchase information (e.g., receipts, attendees, internal codes, itemized purchase list). In other words, the transaction becoming pending in the credit card account triggers the request for purchase information. The transaction manager receives the purchase information and associates it with the pending transaction. Later, financial transfers may occur, and transactions will post to the credit card account. The financial institution sends the posted transactions to the transaction manager. The transaction manager analyzes the posted transactions to identify one that corresponds to the pending transaction. Once identified, the transaction manager associates the purchase information with the posted transaction. The transaction manager may generate expense reports associated with the transaction (i.e., based on the purchase information) and submit the same to the user.

In another case, a user wishes to easily annotate transactions. Accordingly, the user configures her personal device (e.g., user device 120) such that, when a virtual transaction card is used, it triggers a request for purchase information. For instance, the personal device may include virtual wallet with a virtual transaction card. When the virtual transaction card is used (e.g., when it pars with a payment terminal such as merchant device 140), the personal device outputs a prompt for the purchase information. The user can input the purchase information directly into the device (e.g., by capturing a picture of a receipt or through fields in an expense management application). In some cases, the personal device can automatically gather the purchase information, such as by accessing a user's email account to retrieve a receipt email and by identifying attendees (e.g., through calendar requests) or purchase codes (e.g., based on a location of the personal device). The user device may share the purchase information with a server (e.g., transaction server 130 and/or transaction management server 110), which can then attach the information to a pending transaction (and ultimately a settled transaction).

What is claimed is:

1. A user device comprising:
   at least one processor; and
   at least one memory having stored thereon computer program code that, when executed by the at least one processor, controls the user device to:
   activate, on the user device, a virtual wallet application, the virtual wallet application including one or more virtual transaction cards;
   responsive to a first virtual transaction card of the one or more virtual transaction cards being utilized in an approved transaction via the virtual wallet application activated on the user device, output for display, on the user device, a prompt to provide receipt data of a receipt for the approved transaction to the user device;
   following the output for display of the prompt, activate, on the user device, an email application;
   automatically identify, within the email application, a receipt email from among a plurality of emails stored by the email application;
   automatically extract, by the user device, the receipt data from the identified receipt email; and
   output for transmission, from the user device and to a transaction server of a financial institution processing the approved transaction, the receipt data extracted by the user device to be stored in association with the approved transaction by the financial institution.

2. The user device of claim 1 further comprising a camera, wherein the computer program code, when executed by the at least one processor, further controls the user device to:
   activate, on the user device, a camera application corresponding to the camera; and
   capture, using the camera and the camera application, an image of the receipt.

3. The user device of claim 2, wherein the computer program code, when executed by the at least one processor, further controls the user device to verify that the image captured using the camera corresponds to the receipt for the approved transaction.

4. The user device of claim 3, wherein verifying that the image corresponds to the receipt comprises:
   analyzing the image captured using the camera using one or more optical-character recognition algorithms; and
   comparing receipt data extracted from the analyzed image with transaction information of the approved transaction.

5. The user device of claim 1, wherein identifying the receipt email comprises identifying the receipt email based on at least one from among respective delivery times of the plurality of emails, respective sender addresses of the plurality of emails, and text-analysis of one or more of the plurality of emails.

6. The user device of claim 1, wherein extracting the receipt data comprises capturing, by the user device, a screenshot of the identified receipt email.

7. The user device of claim 1, wherein extracting the receipt data comprises automatically forwarding, by the user device, a copy of the identified receipt email to an address associated with the transaction server.

8. The user device of claim 7, wherein forwarding the identified receipt email comprises:
  receiving an indication of a user input of additional transaction information, the additional transaction information comprising one or more of notes, a list of attendees, and project codes; and
  forwarding the additional transaction information together with the identified receipt email to the address associated with the transaction server.

9. The user device of claim 1, wherein the computer program code, when executed by the at least one processor, further controls the user device to:
  execute, on the user device, a receipt capturing application;
  receive the receipt data within the receipt capturing application, the receipt data being input by a user of the user device into the receipt capturing application; and
  provide, within the receipt capturing application, at least one from among:
    a notes field for receiving context to an authorized transaction,
    an attendees field for receiving a listing one or more attendees associated with the authorized transaction, and
    a project field for receiving relevant project codes associated with the authorized transaction.

10. The user device of claim 9, wherein the computer program code, when executed by the at least one processor, further controls the user device to automatically populate the attendees field based on a list of attendees of an event associated with the authorized transaction.

11. The user device of claim 9 further comprising a camera,
  wherein the computer program code, when executed by the at least one processor, further controls the user device to:
    activate, on the user device, a camera application corresponding to the camera;
    capture, using the camera and the camera application, one or more images of a plurality of purchased items purchased by the authorized transaction;
    automatically identify, based on an analysis of the one or more images, a plurality of item identities corresponding to the plurality of purchased items; and
    output for transmission, to the transaction server, data indicative of a list of the plurality of item identities in association with the approved transaction.

12. The user device of claim 11, wherein
  the camera application comprises a barcode reader, and identifying the one or more item identities comprises:
    identifying, within the one or more images, one or more barcodes corresponding to the one or more purchased items;
    transforming the one or more barcodes into one or more numerical representations; and
    matching the one or more numerical representations to identities of the one or more purchased items.

13. The user device of claim 1, wherein the computer program code, when executed by the at least one processor, further controls the user device to verify that the receipt data extracted from the receipt email corresponds to the receipt for the approved transaction by comparing receipt data extracted from the receipt email with transaction information of the approved transaction.

14. A method comprising:
  activating, on a user device, a virtual wallet application, the virtual wallet application including one or more virtual transaction cards;
  responsive to a first virtual transaction card of the one or more virtual transaction cards being utilized in an approved transaction via the virtual wallet activated on the user device, outputting for display, on the user device, a prompt to provide receipt data of a receipt for the approved transaction;
  receiving, by the user device and following the output for display of the prompt, the receipt data corresponding to the receipt for the approved transaction; and
  outputting for transmission, from the user device and to a transaction server of a financial institution processing the approved transaction, the receipt data to be stored in association with the approved transaction.

15. The method of claim 14, wherein receiving the receipt data corresponding to the receipt comprises:
  activating, on the user device, a camera application corresponding to a camera of the user device; and
  capturing, using the camera and the camera application, an image of the receipt.

16. The method of claim 15 further comprising verifying that the image captured using the camera corresponds to the receipt for the approved transaction.

17. The method of claim 16, wherein verifying that the image corresponds to the receipt for the approved transaction comprises:
  analyzing the image captured using the camera using one or more optical-character recognition algorithms; and
  comparing receipt data extracted from the analyzed image with transaction information of the approved transaction.

18. The method of claim 14, wherein receiving the receipt data corresponding to the receipt comprises:
  activating, on the user device, an email application;
  automatically identifying, within the email application, a receipt email from among a plurality of emails stored by the email application; and
  automatically extracting the receipt data from the identified receipt email.

19. The method of claim 18, wherein identifying the receipt email comprises identifying the receipt email based on at least one from among respective delivery times of the plurality of emails, respective sender addresses of the plurality of emails, and text-analysis of one or more of the plurality of emails.

20. A non-transitory computer readable medium having stored thereon computer program code that, when executed by one or more processors of a user device, controls the user device to perform a method comprising:
  activating, on the user device, a virtual wallet application, the virtual wallet application including one or more virtual transaction cards;
  responsive to a first virtual transaction card of the one or more virtual transaction cards being utilized in an approved transaction via the virtual wallet application activated on the user device, outputting for display, on the user device, a prompt to provide receipt data of a receipt for the approved transaction;
  receiving, by the user device the receipt data corresponding to the receipt for the approved transaction; and
  outputting for transmission, from the user device and to a transaction server of a financial institution processing the approved transaction, the receipt data to be stored in association with the approved transaction.

* * * * *